Nov. 12, 1935.  R. E. GEARHART  2,020,603

ILLUMINATED SIGN

Filed May 7, 1934  3 Sheets-Sheet 1

INVENTOR,
Roy E. Gearhart.
BY
Hovey & Hamilton,
ATTORNEYS.

Nov. 12, 1935. R. E. GEARHART 2,020,603
ILLUMINATED SIGN
Filed May 7, 1934 3 Sheets-Sheet 2
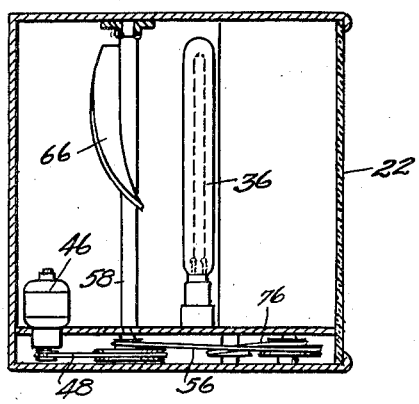
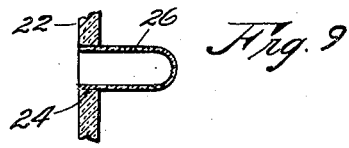
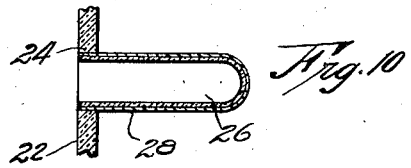
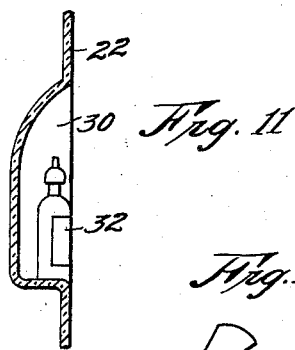
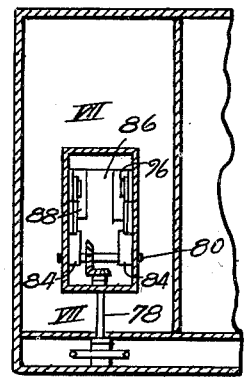
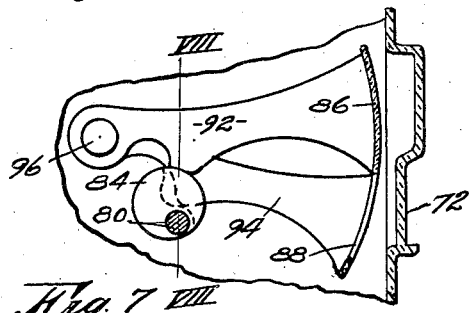
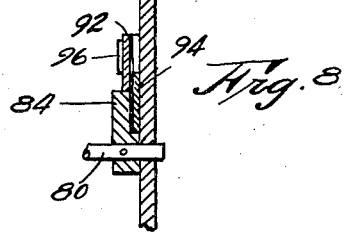
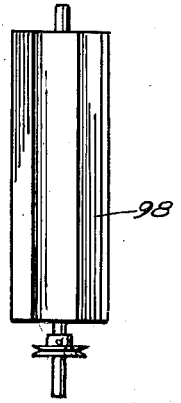
INVENTOR,
Roy E. Gearhart.
BY
Hovey & Hamilton,
ATTORNEYS.

Nov. 12, 1935.  R. E. GEARHART  2,020,603
ILLUMINATED SIGN
Filed May 7, 1934  3 Sheets-Sheet 3

INVENTOR,
Roy E. Gearhart.
BY
Havey & Hamilton
ATTORNEYS.

Patented Nov. 12, 1935

2,020,603

UNITED STATES PATENT OFFICE 2,020,603

ILLUMINATED SIGN

Roy E. Gearhart, Maryville, Mo., assignor of one-half to Elmer A. Holt, Maryville, Mo.

Application May 7, 1934, Serial No. 724,276

16 Claims. (Cl. 40—126)

This invention relates to sign structures of the illuminated type and has for its primary object, the provision of means within such a sign for directing and redirecting the rays of light and acting upon said rays to such an extent that the effect will be concentrated upon the face panel of the sign structure and will present to the observer what appears to be animated objects.

One of the important aims of the invention is to provide in an animated sign, unique and novel means for reflecting rays of light, which means are formed and disposed in such combinations as will produce unusual and novel effects upon the face panel of the sign, which, in turn, is made in a particular manner to have a large number of translucent, hollow domes into which at least a portion of the light rays is projected successively for varying distances to the end that luminescent domes having intermittent periods of greater or lesser illumination are presented to the eye of the observer as the result of combining said domes with the unusual reflecting surfaces.

An even further object of the instant invention is to provide sign apparatus having therein a plurality of mobile reflecting surfaces, together with a prism that is adapted to produce spectra as the mobile reflectors direct rays of light through the said prism.

A large number of minor objects of the invention will, of necessity, appear in the following specification because of the unique manner in which the results are obtained when embodying the concepts of this invention in a sign structure.

In the drawings:

Fig. 5 is another cross section taken on line V—V of Fig. 2.

Fig. 6 is a fragmentary, sectional view taken on line VI—VI of Fig. 4, and looking in the direction of the arrow.

Fig. 7 is an enlarged, fragmentary, detailed view taken on line VII—VII of Fig. 6.

Fig. 8 is a fragmentary, sectional view taken on line VIII—VIII of Fig. 7.

Fig. 9 is a fragmentary, detailed view through a small portion of the face panel of the signs and one of the domes which is affixed to the same.

Fig. 10 is a similar view, showing a coated dome in place.

Fig. 11 is a sectional view through a portion of the face panel of the sign, taken on line XI—XI of Fig. 1.

Fig. 12 is a side elevation of one of the forms of prisms that may be used in the sign.

Fig. 13 is an end elevation of the same.

Figure 1:
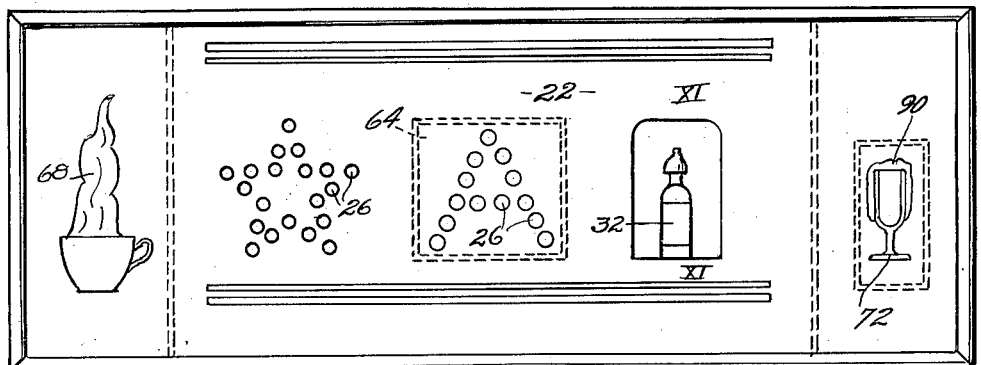
Figure 1 is a face view of a sign made in accordance with the present invention.

One of the preferred manners of constructing an animated sign is shown in Figs. 1 to 11 inclusive and therein the basic concepts are exemplified because of the inclusion of all of the major elements which contribute in the production of a sign having the characteristics found to be commercially desirable. In constructing the sign, there must be provided a casing 20 that is made of any suitable material and formed to house the working parts of the sign structure and to carry across one side thereof, a face panel 22 that comprises a sheet of opaque, translucent or transparent material or a combination of all, depending upon the nature of the message to be conveyed through the sign. It has been found desirable to superimpose sheets of colored, translucent material upon the back or inner face of face panel 22 or, in the case of molded glass or like substance being used in constructing said panel, coloring material may be infused or painted upon the inner surface.

An exceptionally unique result is attained when sign panel 22 is provided with a number of openings 24, in which is placed hollow, transparent or translucent domes 26 as detailed in Figs. 9 and 10. The former figure illustrates an ordinary capsule-like dome that is uncoated, while the latter illustrates a dome 26 that has a coating 28 thereon in the form of the conventional frosting or any suitable color that may be effective.

When making the sign, openings 24 may be arranged to outline or create a figure, as shown in Fig. 1, and when the hereinafter described mobile reflectors are brought into play, an exceptionally "live" effect will be produced. Panel 22 may be of a compositive type, in that a recess 30 may be formed to receive any displayed article 32, such as the bottle shown in Figs. 1, 2 and 11, and may also be figures 34 molded into the panel 22, all to the end that light passing through the panel will be reflected and refracted for the purpose of attracting attention thereto.

Figure 2:
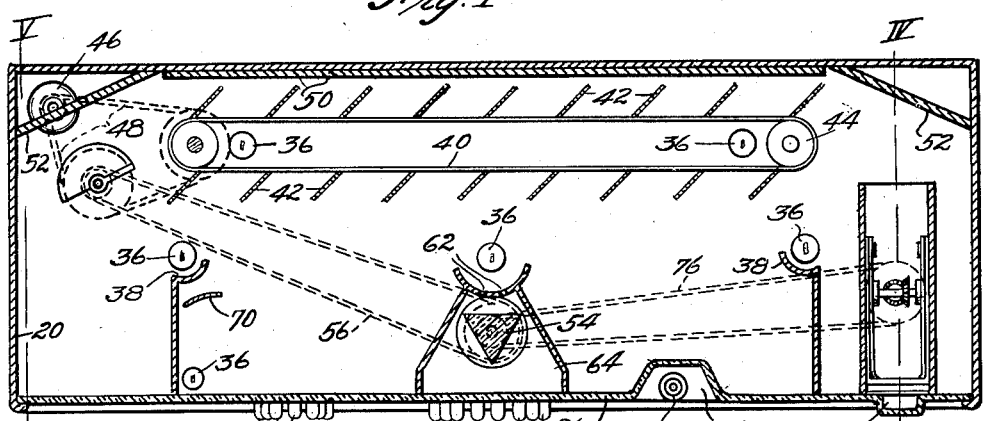
Fig. 2 is a horizontal, longitudinal section through the same.

Within casing 20 there is placed a number of electric light bulbs 36 for the purpose of illuminating sign panel 22. In most instances it will be found preferable to install shields 38 between light bulbs 36 and panel 22 because this invention contemplates the use of indirect rays, all of which are acted upon by mobile reflectors. One form of reflector or reflectors is illustrated in Fig. 2 and comprises one or more endless belts 40, upon which is mounted, in an angular position, a series of reflectors 42. Belts 40 travel around pulleys 44 driven by motor 46 through the medium of belt 48. Two of bulbs 36 are positioned between the stretches of belt 40 and a reflecting surface 50 should be mounted upon the rear wall of casing 20. Two auxiliary, stationary reflectors 52 extend across the opposite corners of casing 20 for the purpose hereinafter set down.

Figure 3:
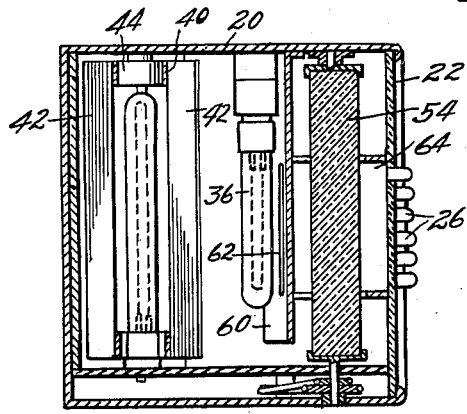
Fig. 3 is a vertical, central, cross section through the sign casing.
Figure 4:
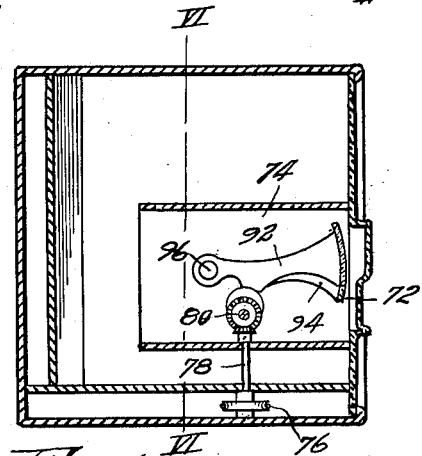
Fig. 4 is a cross section through the sign casing, taken on line IV—IV of Fig. 2.

A prism 54 is rotatably mounted in the position shown in Figs. 2 and 3 and is turned by motor 46 through the use of belt 56 which is driven by the rotation of shaft 58 that, in turn, carries another type of mobile reflector. It is the purpose of this prism to produce a spectrum or a large number of colored, intermittent flashes and to effectively carry out this object of the invention, a specially formed shield 60, having one or more slits 62 therein is mounted between prism 54 and light 36 where the mobile reflectors 42 will periodically cast rays of light of great intensity through said slits.

As both reflectors 42 and prism 54 are moved, colored lights will be directed into the adjacent domes 26 at varying distances and a most unusual and unexpected result is attained. This prism 54, or any number of them, may be used directly behind the groups of domes 26, outlining a character such as shown in Fig. 1, and in order to preclude prism 54 from casting rays of light beyond the area of the character, a confining housing 64 should be employed. Vertical shaft 58 is likewise rotated by motor 46 and the spiral reflector 66 extending around the axis of shaft 58 will catch rays from the adjacent bulb 36 and project them across the area of panel 22 that is outlined to illustrate steam such as shown at 68. The effect produced is one that may be utilized in illustrating rising steam, heat waves, or flowing water, a smaller stationary reflector 70 may also be built into the sign to direct constant rays of light to another group of domes 26.

It oftentimes becomes desirable to produce realistic effects by covering a part of panel 22 to preclude light from passing thereto and also to have means for imparting colors at predetermined times to certain selected areas of the panel. As an example of this invention's fulfillment of such a desirability, there is shown a stein 72 that is the embodiment of the molded figure 34 previously mentioned. Behind this figure 34 is disposed a suitable chamber 74 having walls that allows the passage of light to figure 34 from but one direction. Adjacent light 36 will have its rays cast into chamber 74 by angled reflector 52 and before the light rays are permitted to pass through panel 22, forming figure 34, they may be acted upon by two movable members shown in Figs. 2, 4, 6, 7 and 8. These members are motivated by motor 46 through belts 48, 56 and 76 and a vertical shaft 78 operates horizontal shaft 80 through the medium of miter gears 82.

A cam 84 mounted on shaft 78 moves shields 86 and 88 respectively back and forth behind figure 34 so as to produce the effect of stein 72 being filled and then the foam 90 overflowing therefrom. The constant turning of shaft 78 will raise and lower shields 86 and 88 in proper time and because the former is colored, its reciprocation will produce the effect of liquid raising and lowering in stein 72. Shield 88 is opaque and will block off foam 90 until such time as cam 84 raises or lowers shield 88, which will produce the effect of foam flowing from stein 72. Each of shields 86 and 88 is provided with arms 92 and 94 respectively that are pivotally mounted as at 96, as illustrated in Fig. 6.

The operation of this particular part of the sign has been made clear and it is manifest that many effects may be produced by embodying the broad idea in slightly modified forms.

Figs. 12 and 13 illustrate a modified form of prism that may be employed in the place of prism 54. This prism 98 has a cross sectional contour as shown in Fig. 13 and the multiplicity of variously formed faces thereon will, obviously, produce unusual effects when placed where prism 54 is located in the preferred form.

Figure 14:
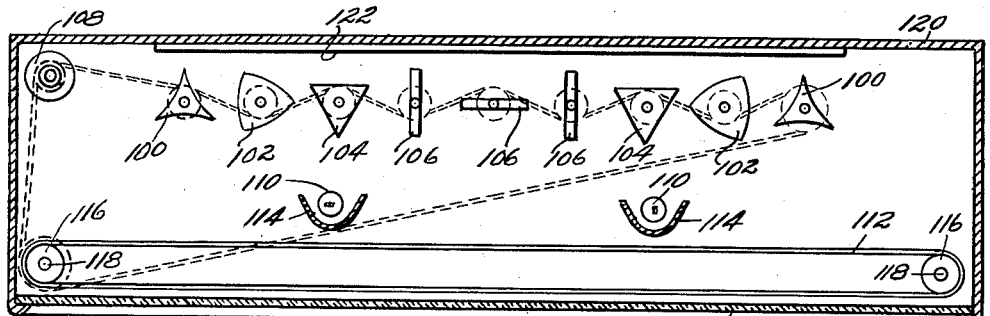
Fig. 14 is a longitudinal, horizontal, cross section taken through a sign casing made to embody one modified form of the invention.
Figure 15:
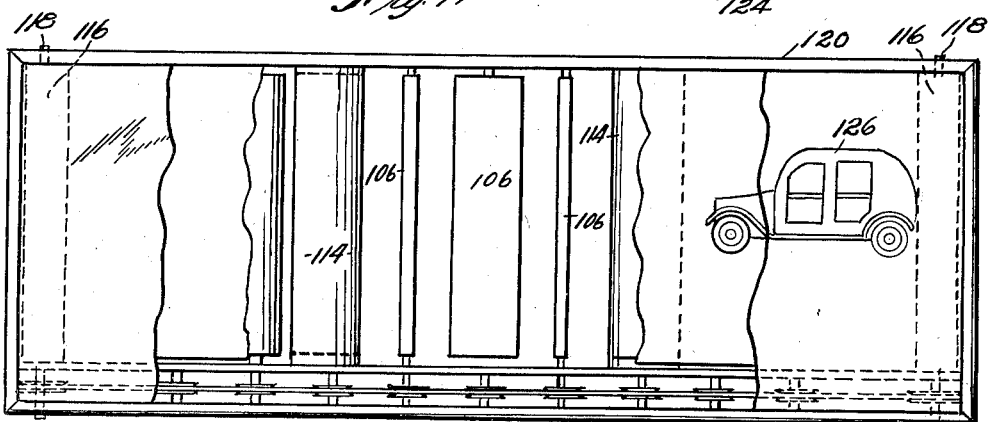
Fig. 15 is a face view of said sign, but with parts broken away for clearness.

In Figs. 14 and 15, the broad idea of incorporating a multiplicity of mobile reflecting surfaces is embodied in those rotatable members 100, 102, 104 and 106. The first mentioned presents a number of concave reflecting surfaces, while 102 presents convex surfaces. The three central members 106 present flat reflecting surfaces, and as all of these members are rotated by motor 108, light rays from bulbs 110 are intermittently directed toward different zones on the moving panel 112.

This panel is in the form of an endless belt and reflectors 114 are positioned between 112 and the movable reflecting surfaces so that no direct light from bulbs 110 is allowed to impinge upon or pass through 112. Panel 112 is mounted upon rollers 116 having axial pintles 118 journalled in casing 120, the rear wall of which has a stationary reflector 122 that extends over the area behind reflectors 100, 102, 104 and 106. There may be a sheet of protecting glass 124 in front of panel 112 and figures such as shown at 126 are painted upon movable panel 112 so that the combined result of all of the parts of this modified form of sign is that of a fast moving object across the sign from one end to the other.

Figure 16:
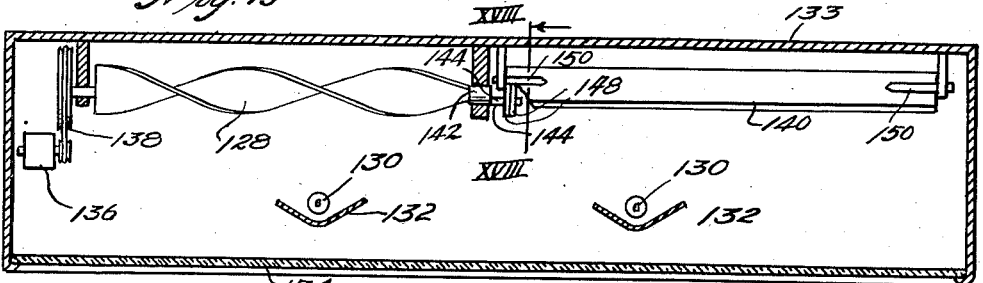
Fig. 16 is a horizontal, sectional view through a sign casing made to embody still another form of the invention.
Figure 17:
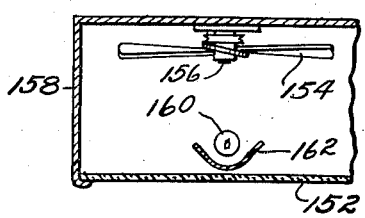
Fig. 17 is a fragmentary, sectional view through a sign casing, wherein is disposed a plurality of mobile reflectors made to embody still another modification of this invention, and, Fig. 18 is a detailed, fragmentary, sectional view taken on line XVIII—XVIII of Fig. 16.
Figure 18:
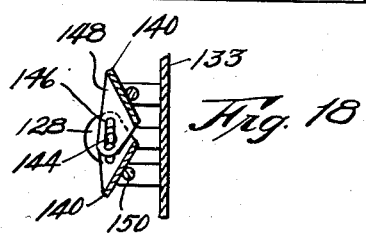

Fig. 16 illustrates still another manner of incorporating in a sign, a number of movable reflecting surfaces and in this embodiment one of the reflecting surfaces is a spiral 128 which reflects light from bulb 130 having shield 132 between panel 134 and said bulb 130. This reflecting surface will direct light rays across the face of panel 134 as it is rotated about its axis by motor 136, geared as at 138 to properly reduce the speed of motor 136 to that desired for spiral 128. If desired, another intermittently movable group of reflector plates 140 may be driven by the rotation of spiral 128. Shaft 142 forming a part of spiral 128, has an eccentric pin 144 in engagement with slots 146 formed in the outturned ends 148 of plates 140, which ends overlap as illustrated in Fig. 18. Plates 140 are pivotally mounted as at 150 so that oscillation about the pivotal point may take place as spiral 128 is rotated.

In the event it is desired to produce the effect of a wheel rotating on sign panel 152, a group of radially extending reflectors 154 may be pivotally mounted as at 156 in casing 158 to direct rays of light from bulb 160 to panel 152. As is the intent of this invention, a shield 162 is interposed between bulb 160 and panel 152 to insure that only indirect rays reach the image painted on said panel.

From the foregoing it will be obvious that the embodying of the broad concepts of this invention in various forms of structure will permit building the unique and novel sign that will produce exceptional results employing but a minimum number of parts. A composite panel producing various effects may be had without a great amount of expense over that required to produce a sign having but a single effect, and it is understood that more modifications than those illustrated and described may be made without departing from the spirit of the invention or scope of the appended claims.

Having thus described the invention, what is claimed as new and desired to be secured by Letters Patent is:

1. A sign of the character described comprising, in combination, a casing; a mobile reflector housed by the casing; a light bulb mounted to cast light rays upon the said reflector; a prism to intercept certain of the rays reflected by the mobile reflector; and means for intermittently actuating the said reflector.

2. A sign of the character described comprising, in combination, a casing; a mobile reflector formed to intermittently cast rays of light from the bulb toward a given zone within said casing; and a prism within said zone to intercept the said rays of light whereby the same are cast upon the sign face as a spectrum.

3. A sign of the character described comprising, in combination, a casing; a mobile reflector housed by the casing; a light bulb mounted to cast light rays upon the said mobile reflector; a rotatable prism to intercept the light rays from the reflector; and common means for actuating the said reflector and prism.

4. A sign of the character described comprising, in combination, a casing having a face panel across one side thereof; a mobile reflector within the casing; a light bulb to cast light rays upon said reflector; a prism mounted between the said face panel and the said reflectors to intercept light rays from the latter; and a shield having restricted openings formed therein disposed between the reflector and prism to form a concentrated beam of the light rays before they strike said prism.

5. A sign of the character described comprising, in combination, a casing having a face panel across one side thereof; a mobile reflector within the casing; a light bulb to cast light rays upon said reflector; a prism mounted between the said face panel and the said reflectors to intercept light rays from the latter; and a shield having restricted openings formed therein disposed between the reflector and prism to form a concentrated beam of the light rays before they strike said prism, said prism being adapted to rotate whereby its several faces successively intercept the said concentrated beam of light rays.

6. A sign of the character described comprising, a casing having a transparent face panel across one side thereof; a plurality of light bulbs mounted within the casing and behind the face panel; a reflector disposed between each of said light bulbs respectively and said panel; a series of mobile reflecting surfaces rearwardly of the light bulbs and reflectors; and means for moving the said reflecting surfaces whereby to direct rays of light from the said light bulbs past said reflectors to the said face panel.

7. A sign of the character described comprising, a casing having a transparent face panel across one side thereof; a plurality of light bulbs mounted within the casing and behind the face panel; a reflector disposed between each of said light bulbs respectively and said panel; a series of mobile reflecting surfaces rearwardly of the light bulbs and reflectors; and means for moving the said reflecting surfaces whereby to direct rays of light from the said light bulbs past said reflectors to the said face panel, said series of mobile reflectors being mounted upon an endless belt to travel past the said light bulbs.

8. A sign of the character described comprising, a casing having a transparent face panel across one side thereof; a plurality of light bulbs mounted within the casing and behind the face panel; a reflector disposed between each of said light bulbs respectively and said panel; a series of mobile reflecting surfaces rearwardly of the light bulbs and reflectors; and means for moving the said reflecting surfaces whereby to direct rays of light from the said light bulbs past said reflectors to the said face panel, one of said reflectors being mounted upon an axis and specially positioned thereabout whereby to cause a succession of light rays to impinge upon the said face panel along a given path.

9. A sign of the character described comprising, a casing having a transparent face panel across one side thereof; a plurality of light bulbs mounted within the casing and behind the face panel; a reflector disposed between each of said light bulbs respectively and said panel; a series of mobile reflecting surfaces rearwardly of the light bulbs and reflectors; and means for moving the said reflecting surfaces whereby to direct rays of light from the said light bulbs past said reflectors to the said face panel, said series of mobile reflectors being mounted upon an endless belt to travel past the said light bulbs, and projected outwardly therefrom at angles to the plane of the face panel of the sign.

10. In a sign of the character described having a casing with a face panel across one side thereof; a plurality of light bulbs mounted within the casing; a series of reflectors to direct rays of light through said face panel; and means for periodically positioning sheets of colored, translucent material between certain given zones of the face panel and the light bulbs.

11. In a sign of the character described having a casing with a face panel across one side thereof; a plurality of light bulbs mounted within the casing; a series of reflectors to direct rays of light through said face panel; and means for periodically positioning sheets of opaque material over certain given zones of the face panel to preclude the passage of light therethrough.

12. In a sign of the character described having a casing with a face panel across one side thereof; a plurality of light bulbs mounted within the casing; a series of reflectors to direct rays of light through said face panel; and means for periodically interposing sheets of colored translucent material between certain parts of the face panel and the light bulb and sheets of opaque material over adjacent zones of said panel.

13. In a sign of the kind described, a casing having a perforated face panel across one side thereof; a translucent, outwardly projected, hollow dome mounted in each perforation respectively of the said panel; a light bulb within the casing behind the said panel; a shield between the panel and said light bulb to preclude direct passage of light rays into the said domes; and a series of mobile reflectors in the casing behind said light bulb whereby to successively project rays of light from the said bulb into the domes from constantly changing points within the casing.

14. In a sign of the kind described, a casing having a perforated face panel across one side thereof; a translucent, outwardly projected, hollow dome mounted in each perforation respectively of the said panel; a light bulb within the casing behind said panel; a shield having a slit formed therein between the panel and said light bulb; a prism mounted between said shield and panel to intercept light rays passing through the said slits in the shield; and a series of mobile reflectors in the casing behind said light bulb whereby to successively project rays of light from the said bulb through said slits and prism and into said domes from changing points within the casing.

15. In a sign of the character described, a casing; a perforated panel across one side of the casing; an opaque, outwardly projected, hollow dome mounted in each perforation respectively; a stationary light bulb within the casing; means to shield the direct rays from said bulb against passing through said perforations; a series of movable reflectors behind said light bulb to project rays of light into said domes from constantly changing points within the casing; a rotatable prism intercepting certain of said rays of light; and common means for moving both the reflectors and prism.

16. In a sign of the character described, a casing having a panel across one side thereof; a light bulb behind said panel; a shield between said light bulb and panel to preclude the direct passage of light rays from the light bulb to the panel; and a series of movable reflecting surfaces behind said light bulb to direct light rays from the bulb to the panel, said panel being movable simultaneously with the said reflecting surfaces to create an animated effect on the eye of the observer.

ROY E. GEARHART.